United States Patent [19]
Schroeder

[11] 4,450,536
[45] May 22, 1984

[54] OPTICAL COMPOSING STAGE

[76] Inventor: Warren E. Schroeder, 134 Main St., Hackensack, N.J. 07601

[21] Appl. No.: 346,207

[22] Filed: Feb. 5, 1982

[51] Int. Cl.³ .............................................. G03B 27/62
[52] U.S. Cl. ....................................... 355/75; 355/126
[58] Field of Search .................. 355/125, 126, 53, 54, 355/74, 75

[56] References Cited

U.S. PATENT DOCUMENTS

| | | | |
|---|---|---|---|
| 1,893,156 | 1/1933 | Bern | 355/74 |
| 3,704,946 | 12/1972 | Brault et al. | 355/53 X |
| 3,972,613 | 8/1976 | Plumadore | 355/75 |
| 4,095,895 | 6/1978 | Seelen et al. | 355/75 X |

*Primary Examiner*—Richard A. Wintercorn

[57] ABSTRACT

An improved optical composing stage is disclosed which has a variable-area aperture including a plurality of aperture-defining blades which are angled at their leading edges so that light incident thereon from a light source is directed out of the field of view of a recording medium, whereby image flaring due to edge reflection is prevented. The optical composing stage further comprises a composite structure made up of parallel plates. Convenient horizontal angular alignment adjustment of the plates is obtained in that a locating pin on a lower plate extends upward into a locating groove formed in the underside of a rotatable skew adjustment knob. The stage further includes a plurality of spaced object planes which provide for simultaneous imaging of a plurality of negatives, each separately controllable as to whether it is in focus or out of focus.

4 Claims, 14 Drawing Figures

OPTICAL COMPOSING STAGE

BACKGROUND OF THE INVENTION

1. Field of the Invention

This invention relates to improvements in optical imaging composition apparatus, and especially to improvements in optical composing stages having a variable-area aperture for masking undesired portions of objects during the preparation of images by means of multiple exposures thereof.

2. Description of the Prior Art

The creation of composite images of objects using multiple exposure techniques is well-known. An important application of such technology is in the production of multi-colored images from black/white transparencies. Optical slides and prints, for example, can be produced by successive exposures of a suitable optical recording medium (i.e. color film or photosensitive paper) by sequentially imaging selected portions of originals illuminated by different colored light. Effective information presentation displays can be produced in this manner, such as bar charts, line graphs, pie charts, columnar charts and other special effects.

In a typical arrangement for the production of colored slides from black/white negatives, an optical composing stage is employed which has a variable-area aperture for successively presenting selected portions of the negative for imaging by transmission therethrough of diffused light from an illuminating light source onto the color slide film. For example, a 35 mm black/white negative is mounted by means of registration pins which engage the negative sprocket holes at an object plane in the housing of the stage. The housing has a window for directing light incident from an illuminating light source through the mounted negative for imaging by means of an adjacently positioned camera onto a photosensitive color film. A color-programmable, optical light filtering apparatus such as a "SLIDELIGHT" light box commercially available from Spectrum Studios, Hackensack, N.J., is used to provide an illuminating light source to give the desired light color hue, density and intensity. A plurality of movable blades positioned near the stage object plane, provides a variable-area aperture by which the negative can be suitably masked to present a selected portion of the negative for imaging by transmission therethrough of light of the selected color characteristics.

The process from art work to 35 mm black/white negative to multicolored display slide is relatively easy using an optical composing stage of a type to which the present invention finds application. For a typical word slide, a black/white 35 mm negative is prepared by photographing the prepared art work. The resulting black/white negative is positioned within the window of the optical composing stage by means of the registration pins. The blades of the variable-area aperture are then adjusted to reveal the first of the specific areas of the negative required for coloring. The desired color is set on the light box and transmitted through the unmasked portion of the negative as a first exposure of a frame of slide film located in a camera above the stage. The variable-area aperture is then adjusted to reveal the next selected portion of the black/white negative (or a selected portion of another negative) to colored light selected at the light box, and exposure proceeds in a similar way until the slide is completely exposed to provide a composite of the successively presented selected portions of the object negative (or negatives).

One problem encountered in the use of conventional optical composing stage is so-called "flaring" in the imaging of a presented portion of the object transparency due to the reflection and dispersion of light incident from the illuminating source onto the leading edges of the variable-area aperture-defining blades. The flaring manifests itself in the form of a fringed outline of the aperture setting of each selected object portion. The movable blades which define the aperture size are typically configured as two pairs of parallel opposed blades disposed at right angles. The composite image is thus compiled by imaging selected rectangular portions of the object transparency (or transparencies); and flaring takes the form of rectangular outlines surrounding different parts of the composite image. Such flaring distracts from the aesthetic appearance of the composite image and is thus undesirable.

Attempts have been made to minimize the flaring due to light reflections from the leading edges of the blades by reducing their thickness. Nevertheless, with the high resolution, long tonality and color high fidelity films usable for slide preparation today, even at blade thicknesses on the order of 0.006 inches or less (achievable by using thin film materials for blades), unacceptable flaring is still present.

Another problem confronting composite image construction using conventional optical stages is the achievement of good alignment between the position of horizontal and vertical linear characters or patterns on an object transparency and the sides of the rectangular opening of the variable-area aperture. For conventional stages, misalignment of the horizontal and vertical lines of the object transparency and the edges of the variable aperture is corrected by repositioning, i.e. rotating, the transparency in its mounted position on the stage, e.g. moving the alignment of the sprocket holes of a 35 mm black/white negative relative to the stage registration pins. This procedure is inaccurate, cumbersome and time-consuming and may require breaking the sprocket holes. Thus, a need exists for convenient rapid realignment of the transparency relative to the variable-area aperture.

Furthermore, though special effects are possible using conventional optical composing stages having a single object plane at which to mount a transparency, or at which to mount a plurality of immediately adjacent transparencies, the additional flexibility for special effects which would be offered by a plurality of spaced object planes in a single composing stage (wherein, e.g. one transparency could be in focus while a second transparency is out of focus) is not available.

SUMMARY OF THE INVENTION

It is an object of the present invention to provide an improved optical composing stage having a variable-area aperture designed to eliminate flaring due to light incident on the leading edges of blades which define a variable-area aperture for successively presenting selected portions of an object transparency for imaging.

It is a further object of the invention to provide an improved optical composing stage having means for conveniently aligning the leading edges of blades making up a variable-area aperture with indicia and patterns on an object transparency positioned for imaging on the stage.

It is another object of the invention to provide an improved optical composing stage having more than one object plane at which to locate a transparency for selective presentation for imaging using a variable-area aperture.

In accordance with one aspect of the invention, an improved optical composing stage is provided having a variable-area aperture for successively presenting selected portions of an object transparency for imaging by transmission therethrough of light from an illuminating light source onto an optical recording medium, which has an improved aperture-defining blade configuration. The leading edge of the blade is shaped so that light incident thereon from the light source will be directed out of the field of view of the recording medium, whereby flaring due to edge reflection is prevented.

In another aspect of the invention, an improved optical composing stage is provided having means incorporated therein for conveniently and rapidly adjusting the relative angular orientation of the edges of a variable-area aperture relative to the orientation of characters or patterns appearing on a transparency mounted at an object plane of the stage.

In a further aspect of the invention, an improved optical composing stage having a variable-area aperture for successively presenting selected portions of a transparency mounted at an object plane, has one or more additional object planes at which an additional transparency or additional transparencies can be mounted.

There have thus been outlined rather broadly certain objects, features and advantages of the invention in order that the detailed description that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purpose of this invention. It is important, therefore, that this disclosure be regarded as including all such equivalent arrangements that encompass the spirit and scope of the invention.

BRIEF DESCRIPTION OF THE DRAWINGS

Embodiments of the invention have been chosen for purposes of illustration and description, and are shown in the accompanying drawings forming a part of the specification, wherein.

and

Throughout the drawings, like elements are referred to by like numerals.

DESCRIPTION OF THE PREFERRED EMBODIMENTS

Figure 1:
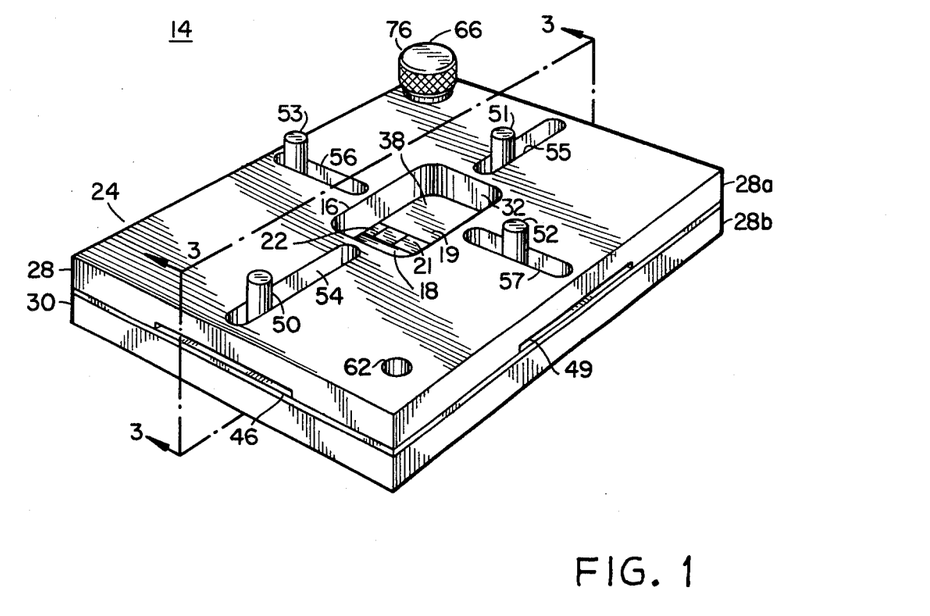
FIG. 1 is a perspective view of an embodiment of an optical composing stage in accordance with the present invention.
Figure 2:
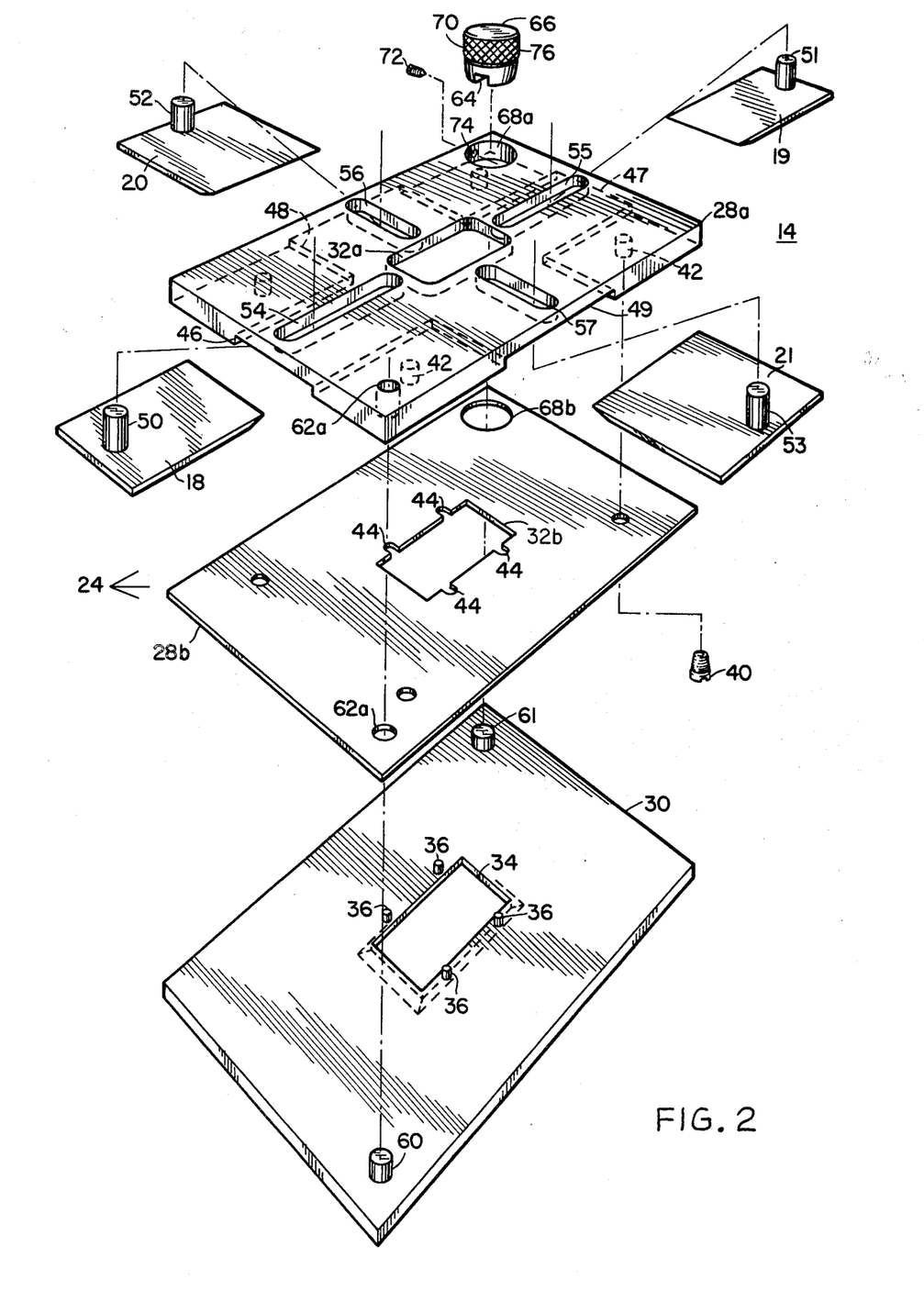
FIG. 2 is an exploded view of the stage of FIG. 1.
Figure 3:
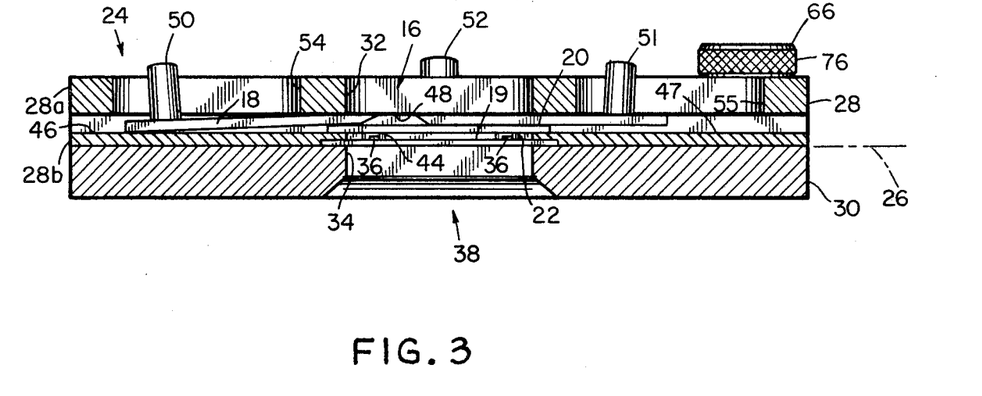
FIG. 3 is a section view taken along the plane 3-3-3-3 of FIG. 1.

FIGS. 1-3 illustrate an example of an embodiment of an optical composing stage 14 constructed in accordance with the invention. The example stage 14 has a variable-area aperture 16 comprising four aperture-defining blades 18, 19, 20 and 21 suitable for successively presenting selected portions of a mounted black-white negative 22 for composite imaging by an optical recording medium, such as the slide film of a camera.

Figure 5:
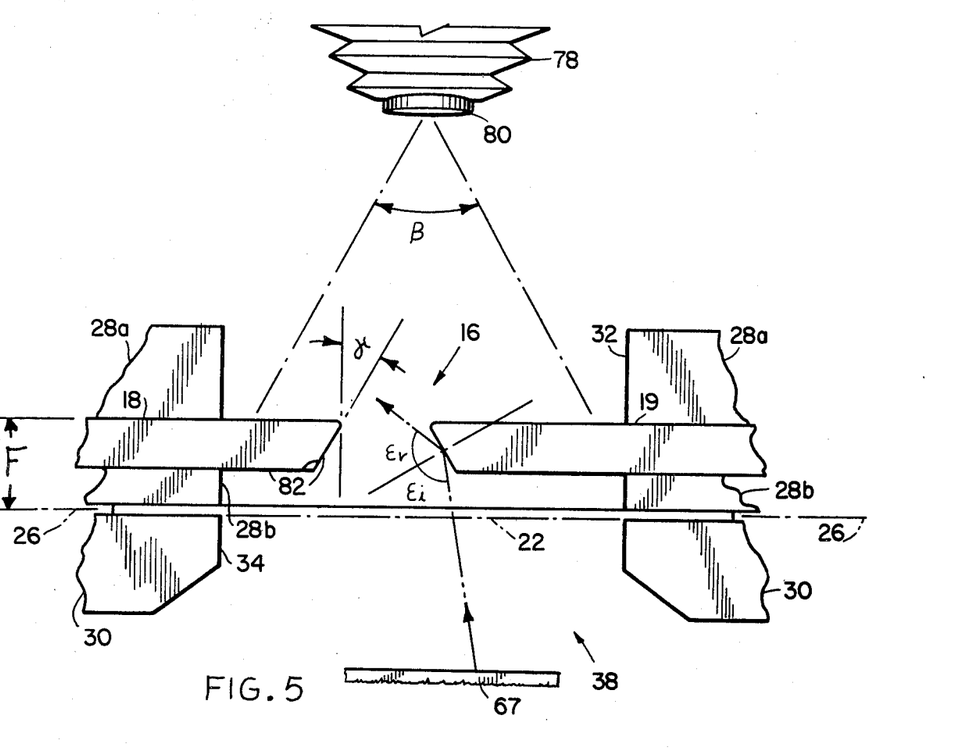
FIG. 5 is a schematic view of a portion of FIG. 3.
Figure 6:
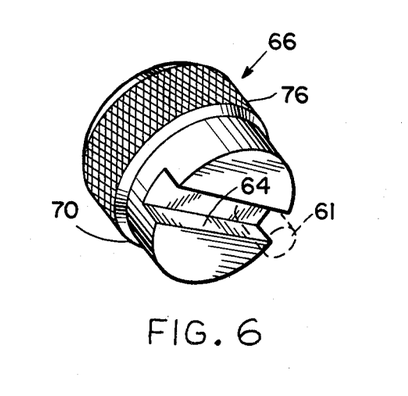
FIG. 6 is a perpective view of the skew adjustment knob of the stage of FIG. 1.

A housing 24 of the stage 14 provides support for the blades 18-21 of the variable-area aperture and also provides a platform for mounting the negative 22 at an object plane 26 (see FIG. 5). The housing 24 is a composite structure including a rectangular top plate 28 which is placed in positional alignment above an identically rectangular base plate 30. Both the top and bottom plates 28, 30 are formed with central openings 32 and 34, respectively. A plurality of registration pins 36 arranged bordering the central opening 34 on the upper surface of the base plate 30 provide registration for a 35 mm black/white negative 22 placed over the opening 34. The openings 32 and 34 align when the top plate 28 is positioned above the base plate 30 to provide a window 38 vertically through the center of the housing 24 (see FIG. 3) which permits light directed from beneath the base plate 30 of the assembled stage 14 toward the entrance of the opening 34 to be transmitted through the portion of the transparent negative 22 and imaged through the opening 32 onto an optical recording medium located above the exit of the window 38.

The top plate 28 (see FIG. 2) comprises a thick layer 28a and a thin layer 28b of rigid material having matching rectangular shape which fasten together by suitable means, such as flathead screws 40 which thread into correspondingly threaded holes 42 so that they are flush with the bottom surface of the thin layer 28b. The portion of the opening 32 formed in the thin layer 28b of the top plate 28 includes a plurality of border indentations 44 which serve as recesses to receive the registration pins 36 of the base plate 30 when the stage 14 is assembled after insertion of a negative 22.

The top plate 28 is further configured with guide channels 46, 47, 48 and 49 which serve respectively to guide the movement of the aperture-defining blades 18, 19, 20 and 21 during adjustment of the variable-area aperture 16. The respective extensions of the leading edges of the blades 18-21 into the window 38 are controlled manually by movement of the posts 50, 51, 52 and 53 which can be moved within the elongated slots 54, 55, 56 and 57 which are cut above the guide channels 46-49 in the thick layer 28a of the top plate 28.

Figure 4:
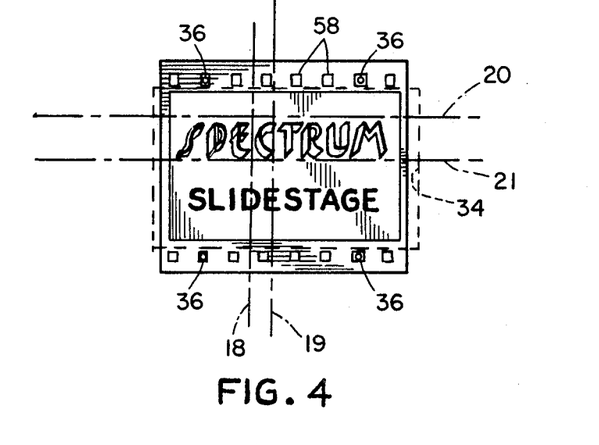
FIG. 4 is a schematic representation of a mounted transparency useful in explaining the operation of the stage of FIG. 1.

As already described above, a black/white negative 22, e.g. containing lettering as shown in FIG. 4, is mounted in the window 38 of the stage 14 by placing its sprocket holes 58 over the registration pins 36 and laying it over the opening 34 on the upper surface of the base plate 30 (see FIG. 4). The base plate 30 serves as an object plane or platform for the negative 22. After the negative is placed on the registration pins 36, the under surface of the top plate 28 is brought into contact with the upper surface of the base plate 30. Locating pins 60 and 61 extending vertically up at diagonally opposite corners from the upper surface of the base plate 30 align the two plates by mating respectively into a locating hole 62 in the top plate 28 and a locating groove 64 running across the underside of a skew adjustment knob 66 which is positioned within an opening 68 extending through the top plate 28.

Figure 7A:
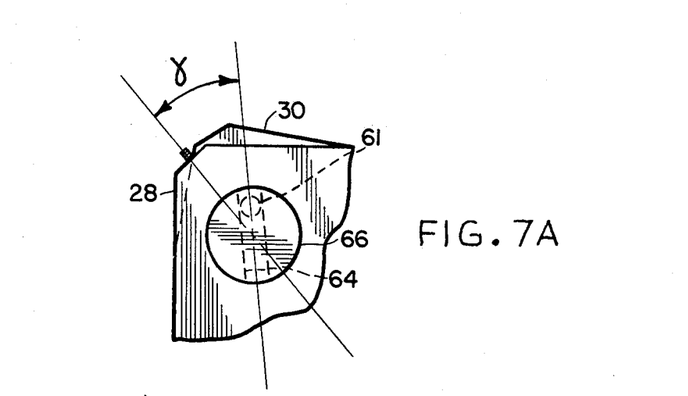
FIGS. 7A-7C are schematic views useful in understanding the operation of the device of FIG. 6.
Figures 7B, 7C:
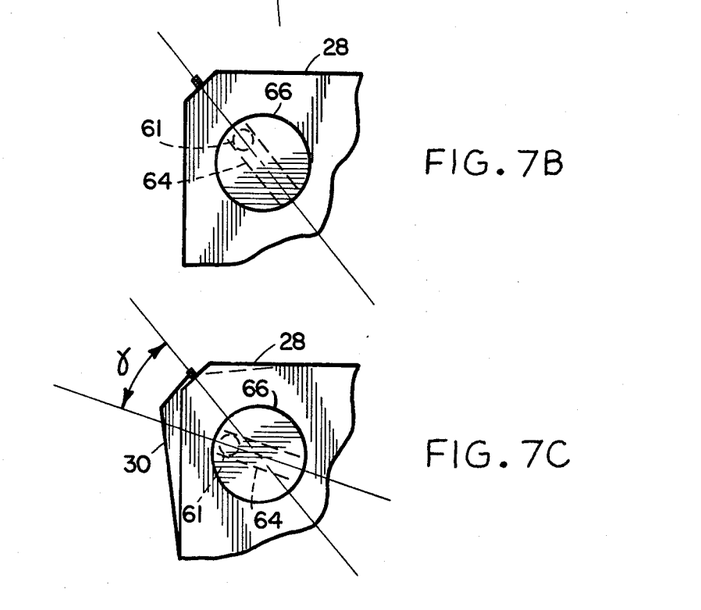

The skew adjustment knob 66 is circumscribed by a peripheral groove 70. A screw 72 is threaded into a bore 74 situated at the corner of the thick layer 28a of the top plate 28, so that its tip protrudes into the opening 68 and extends against the groove 70 of the knob 66. The screw 72 acts against the groove 70 to restrain the knob 66 from vertical movement relative to the top plate 28. The knob is, however, free to rotate within the opening 68 and is knurled at its top 76 to facilitate manipulation by the user. Lateral alignment of the plates 28 and 30 is controlled by positioning the locating pins 60 and 61 within the hole 62 and groove 64 respectively. The relative positions of locating pin 60 and locating hole 62 are fixed; the relative positions of locating pin 61 and locating groove 64 are, however, changeable in dependence on the rotational orientation of the skew adjustment knob 66. This is illustrated in FIGS. 7A–7C. When the knob 66 is oriented with its groove 64 in line with the diagonal of the plate 28 (see FIG. 7B), the sides of the plates 28 and 30 are in complete alignment. This is a satisfactory setting when the leading edges of the blades 18–21 have the desired alignment with the selected portion (e.g. "C" in FIG. 4) of the mounted negative 22. If, however, the selection portion of the mounted negative 22 is out of alignment (i.e. rotated) relative to the aperture defined by the edges 18–20 (FIG. 4), convenient alignment can be achieved by rotating the knob 66 either clockwise as shown in FIG. 7A, or counterclockwise as shown in FIG. 7C. For the configuration shown, an angular horizontal alignment adjustment of ±15° is contemplated.

As shown in FIG. 5, the blades 18–21 are flat blades having parallel upper and lower surfaces and leading edges which are flat and angled. The angle of the leading edge is selected so that light incident thereon from a diffused light source 67 located below the stage 14 is reflected at an angle which directs it out of the field of view of the recording medium such as film contained within a camera 78 (FIG. 5) having a lens 80 with an angle of view $\beta$. With reference to FIG. 5, therefore, to direct all rays incident on the leading edge of a blade (18 or 19) at an angle $\epsilon_i$ at an angle of reflection $\epsilon_r$ which directs the ray out of the field of view of the camera lens 80, the blade angle $\gamma$ between the leading edge and a line drawn normal to the upper surface of the blade must be greater than one-half the angle of view $\beta$ of the lens 80. Accordingly, the blade (e.g. blade 18 in FIG. 5) is formed with a leading edge that makes an angle 82 between the lower surface of the blade (light source proximal surface) and the leading edge which is greater than one-half of the angle of view $\beta$ plus 90°. Such angling will prevent flaring effects on the images of the successively presented selected portions of the negative 22. A coating is preferably applied to the blades 18–21 at least at the junctures between the upper surfaces (light source distal surfaces) and the leading edges to prevent the occurrence of the optical phenomenom associated with sharp knife-edges. A suitable coating for such purpose is a matte black paint having a high pigment content, such as is sold under the tradename "RUSTOLEUM".

As seen in FIGS. 2, 3 and 5, the lower portion of the central opening 34 of the base plate 30 is outwardly tapered. This is to allow the highly diffused light from the illuminating light source 67 (FIG. 5) such as from a "SLIDELIGHT" programmable lightbox, to fully illuminate the mounted negative 22. The angling of this tapering is not critical. Nevertheless, as shown by the configuration of a base plate 30" (FIG. 12) in the modified form 14" of the optical composing stage 14, the upper portion of the opening 34 of the base plate 30 can be angled in the same manner as the described angling of the blades 18–21. This prevents light reflected off the vertical walls defining the opening 34 from interfering with the clarity of the composite image prepared using the stage 14.

The opening 32 in the top plate 28 of the stage 14 must be large enough so as not to obstruct the imaging process. As shown in FIG. 5, the dimension of the opening 32 must be large enough so as not to interfere with the largest desirable area setting of the variable-area aperture 16. The opening 32 serves the purpose of a matte shield to permit the imaging process to be conducted in the presence of ambient light, i.e. with the room light on. The vertical walls defining the opening 32 of the top plate 28 may, however, also be angled as shown by the top plate thick layer 28a" and thin layer 28b" in FIG. 12; the angling principles being the same as already discussed above.

In the imaging of a selected portion (e.g. "C" shown in FIG. 4) of the object transparency 22, the optical recording medium such as the camera 78 of FIG. 5, is preferably set so that its depth of field will encompass (i.e. have in focus) the region F from the upper surfaces of the blades 18–21 to the negative 22 (object plane 26). The dimensions of the stage are thus selected so that the distance F will satisfy this.

Figure 8:
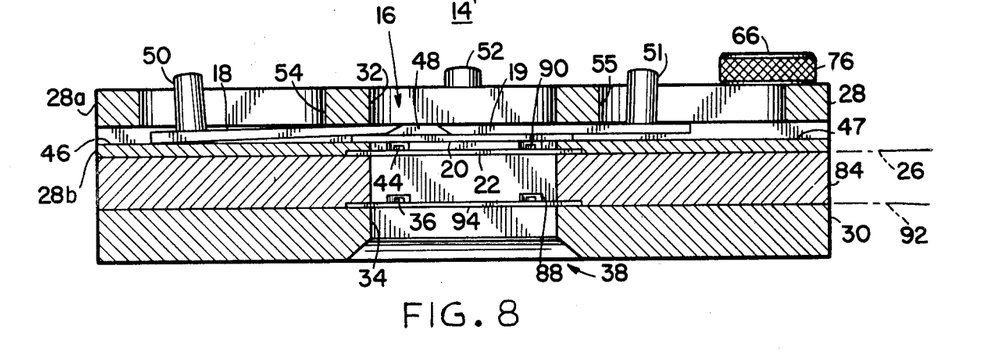
FIG. 8 is a section view (corresponding to the section view of FIG. 3) of a modified form of the stage of FIG. 1.
Figure 9:
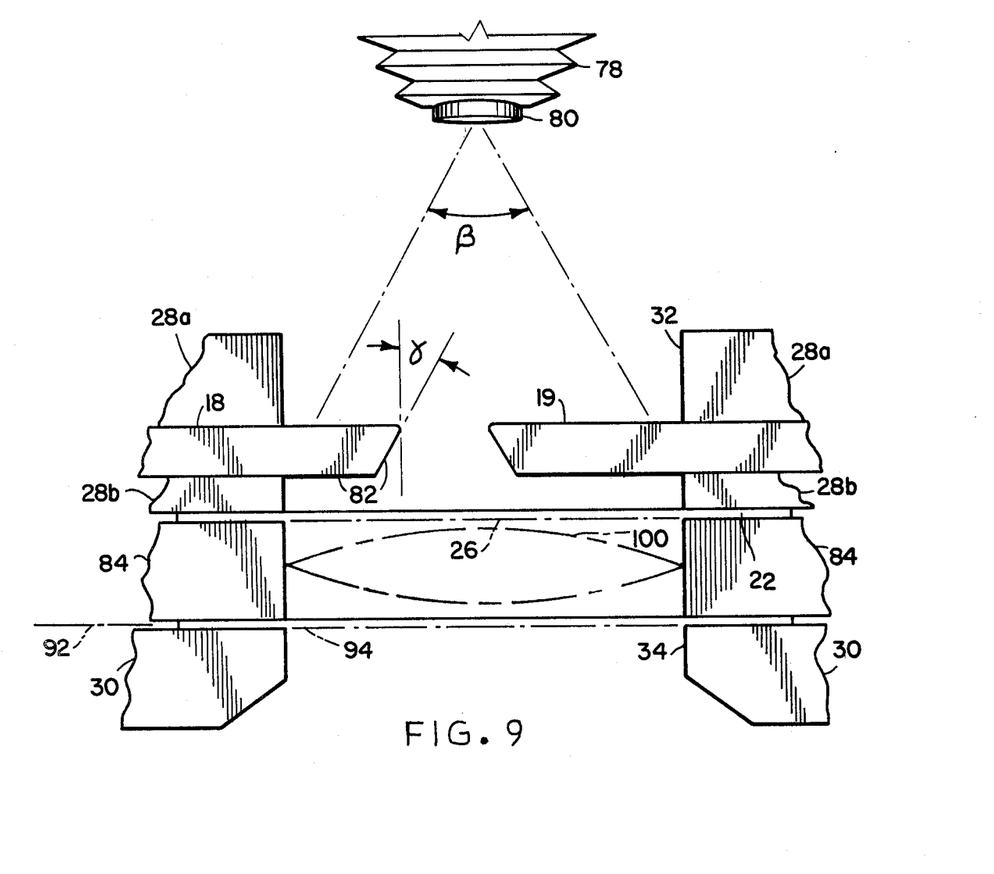
FIG. 9 is a schematic view (corresponding to the schematic view of FIG. 5) of the modified form of stage shown in FIG. 8.
Figure 10:
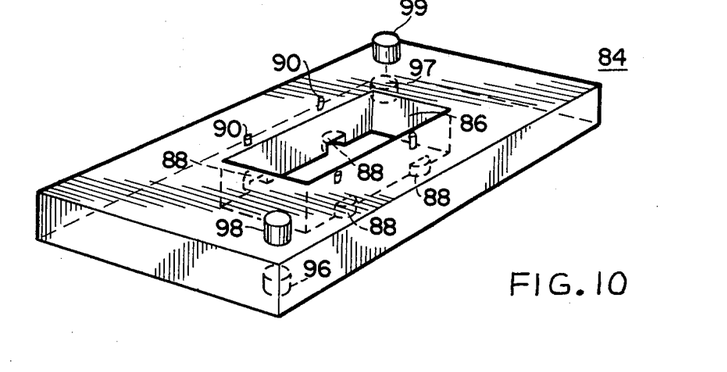
FIG. 10 is a perspective view of the middle plate of FIG. 8.

FIGS. 8 and 9 illustrate a modified form 14' of the embodiment shown in FIG. 1, wherein the composite stage structure is augmented by the addition between the top plate 28 and the base plate 30 of an intermediate plate 84. The intermediate plate 84 is shown in FIG. 10. It has a central opening 86 which matches the dimensions of the respective openings 32 and 34 of the top and base plates 28 and 30. A plurality of indentations or recesses 88 which border the lower portion of the opening 86 serve the same function as the border indentations 44 located in the opening 32 of the top plate 28. Further, a plurality of registration pins 90 bordering the top of the opening 86 serve the same function as the registration pins 36 on the base plate 30.

When the intermediate plate 84 is brought into position between the top plate 28 and the base plate 30, a second object plane 92 is provided at which a second negative 94 can be positioned in a manner similar to that described above with reference to the negative 22. Alignment between the base plate 30 and the intermediate plate 84 is accomplished in that the locating pins 60 and 61 (see FIG. 2) of the base plate 30 pass into the locating holes 96 and 97 respectively formed in the underside of the intermediate plate 84. Alignment between the top plate 28 and the intermediate plate 84 is accomplished in that the locating pins 98 and 99 (FIG. 10) on the upper surface of the intermediate plate 84 mate with the locating hole 62 of the top plate 28 and the locating groove 64 of the skew adjustment knob 66.

The provision of a second object plane 92 at which a second negative 94 can be positioned provides great flexibility to the optical composing stage and permits the use of the stage for special effects not previously achievable with a single object plane. The negative 22 can, for example, be imaged in focus while a background out of focus or in focus image can be simultaneously obtained from the negative 94. Further, patterns can be added at the second object plane 92 to enhance the obtainable range of color characteristics selectable at the entrance to the window 38.

Figure 11:
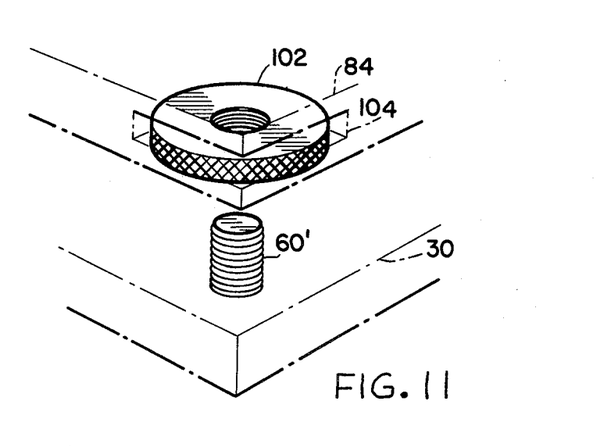
FIG. 11 is a modified form of plate positioning mechanism.

It will be appreciated by those skilled in the art that a lens 100 (shown in phantom in FIG. 9) can be inserted between object planes to provide control of the focusing of the planes. In this manner, the composite structure of the optical composing stage 14' can be expanded to include an even greater number of object planes which can be selectively placed in focus or out of focus in accordance with the desired effects. Alternatively, a modified plate alignment mechanism can be constructed, as shown for example in FIG. 11, for controlling the focus of a plurality of object planes. FIG. 11 shows a modified form of locating pin 60' which is externally threaded to mate with an internally threaded thumb-wheel disc 102 inserted in a cut-out 104 in the corner of the adjoining plate.

Figure 12:
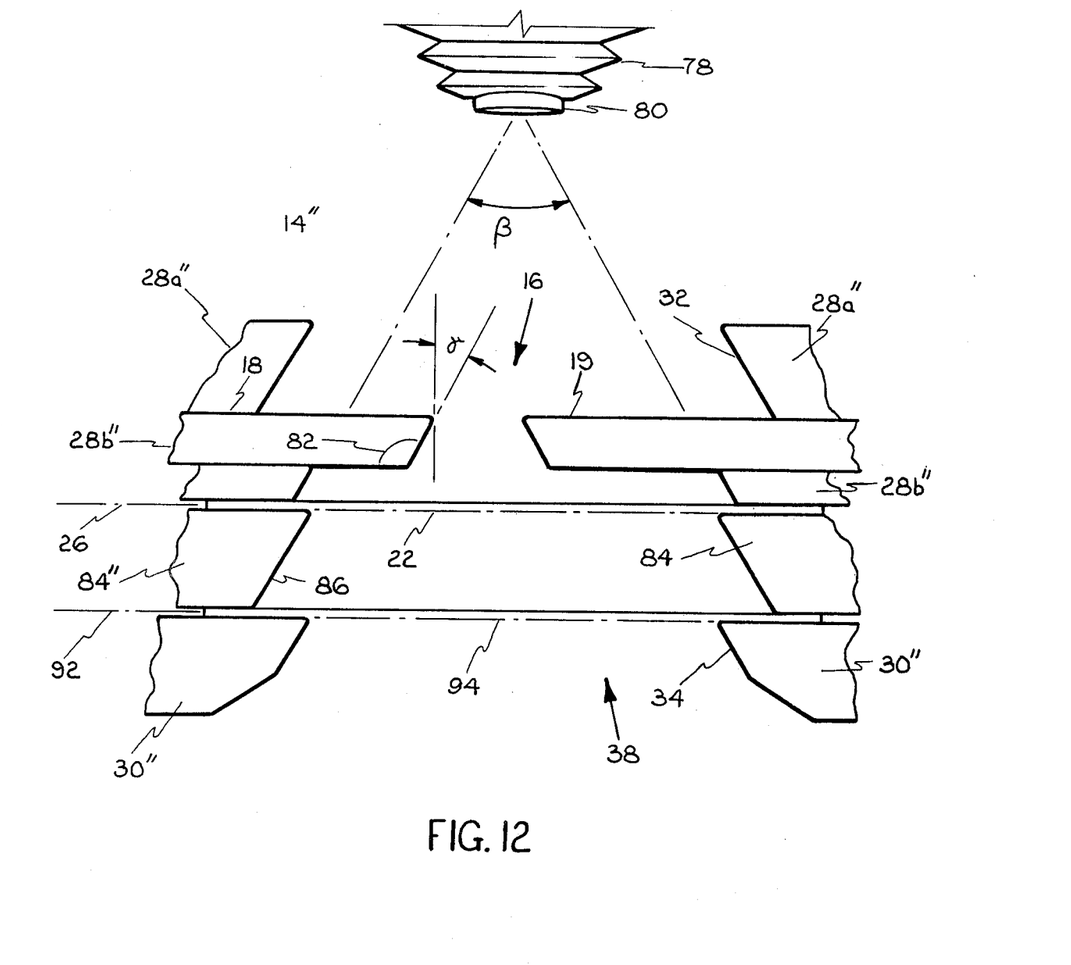
FIG. 12 is a schematic view (corresponding to the schematic views of FIGS. 5 and 9) of a further modified form of the stage of FIG. 1.

The modified embodiment 14" of the stage includes an intermediate plate 84", the vertical walls defining the opening 86 of which have been angled to reflect light out of the field of view of the optical recording medium.

Having thus described the invention with particular reference to certain preferred forms thereof, it will be obvious to those skilled in the art to which the invention pertains, after understanding the invention, that various changes and modifications may be made therein without departing from the spirit and scope of the invention as defined by the claims appended hereto. Positional references of certain elements shown in the drawings (such as "upper", "lower", etc.) have been made throughout the specification merely to facilitate the explanation of the preferred embodiments, and such positional references should not be viewed as limiting the position to which such elements may have in other embodiments. Similarly, it will be appreciated that the dimensions, shapes, materials and layout of the various elements may be varied to suit individual tastes and requirements.

What is claimed is:

1. In an optical composing stage having a variable-area aperture for successively presenting selected portions of an object transparency mounted thereon for imaging by transmission therethrough of light from an illuminating light source incident on one side of the aperture onto an optical recording medium by means of a lens system having an angle of view for viewing light transmitted through to the other side of the aperture, the improvement comprising:

a movable aperture-defining blade, having a light source proximal surface, a light source distal surface and a leading edge; the leading edge of which is shaped so that diffused light incident thereon from the light source will be directed out of the angle of view of the lens system, whereby image flaring due to edge reflection is prevented.

2. An improvement as defined in claim 1, wherein the proximal and distal surfaces of the blade are flat parallel surfaces and wherein the leading edge is a flat surface angled relative to the proximal surface at an angle greater than one-half of the angle of view of the recording medium plus 90°.

3. An improvement as defined in claim 2, further comprising a coating applied at the juncture between the distal surface and the leading edge, thereby preventing the occurrence of the sharp knife-edge optical phenomenon by dulling the juncture.

4. An improvement as defined in claim 3, wherein the coating comprises a black paint having a high pigment content.

* * * * *